2,884,335
GUM ACCROIDES ADHESIVE COMPOSITION

William R. Moffitt, Stamford, Conn., and Morris B. Berkey, Mercer Island, Wash., assignors to The Borden Company, New York, N.Y., a corporation of New Jersey No Drawing. Application June 11, 1956
Serial No. 590,366

2 Claims. (Cl. 106—208)

This invention relates to a glue-mix and, more particularly, to a glue-mix prepared by reacting together gum accroides and an aldehyde.

An object of this invention is the provision of a resin prepared by the reaction of gum accroides and an aldehyde.

A further object is to provide a resin capable of being employed as a base for glue-mixes utilized in the manufacture of exterior-grade plywood and hardboard.

An additional object is to provide a resin which is less expensive than other resins of a similar quality.

These and other objects and advantages of the invention are achieved by the employment of processes and procedures embodying the invention as illustrated in the following description.

Turning now to the invention proper, it is seen that the same comprises a resin prepared by reacting together gum accroides and an aldehyde. Prior to presenting a method for making the resin a word will be mentioned in regard to the gum accroides. This is a natural gum of vegetable origin which is defined as exudations from the plants of the species Xanthorrhoea (*hastilis, Australis,* etc.) belonging to the order Asphodeleae and, generally, known in commerce under various names such as acaroid gum or yacca gum, and sometimes as blackboy gum or Botany Bay gum or earth shellac. One of the places this gum occurs most plentifully is on the continent of Australia.

A glue-mix having gum accroides as a constituent is prepared by forming an aqueous mixture of the gum, an aldehyde, and an alkaline catalyst. In addition to these constituents, there are added to the aqueous mixture a second alkaline catalyst such as sodium carbonate, a water soluble galactan-type gum and a filter such as Glufil. In order to more quickly and to more completely react the components, the aqueous mixture is heated to a temperature in the range of 175–200° F. for a sufficiently long period of time to form the glue-mix. Upon cooling the glue-mix is ready for use in the manufacture of plywood.

In these glue-mixes it is believed that the gum accroides and the aldehyde react to form a polymeric-type product. As to the individual components a large number of aldehydes such as formaldehyde, benzaldehyde and acetaldehyde are appropriate for use with the gum accroides. If formaldehyde be employed, the same is normally added as formalin, an aqueous solution comprising on a weight basis about 37% formaldehyde, 1–15% methanol and the balance water. Of course, other sources of formaldehyde such as paraformaldehyde or hexamethyltetramine may be used instead of formalin. The alkaline catalyst is a strong hydroxide of the alkali metal family such as sodium hydroxide or potassium hydroxide, and acts as both a catalyst for the reaction and as a solubilizer for the resulting polymeric product so as to maintain the same in solution. Similarly, the sodium carbonate functions as a catalyst and a solubilizer. Other appropriate catalysts which may be used in place of the sodium carbonate are potassium carbonate, calcium hydroxide and magnesium hydroxide.

A filler such as Glufil makes it possible to extend the glue-mix so that, in effect, less mix is required for a given bonding operation. Glufil is of vegetable shell origin, comminuted clean walnut shells, and is a product of the Agrashell Corporation, Los Angeles, California. In regard to the galactan-type gum, the same may be locust bean gum, guar gum, or karaya gum, and acts as a thickener for the glue-mix and also functions to maintain a more uniform viscosity in said mix.

The alkaline material may be sodium hydroxide or the equivalent, and, as is well known, functions as both a catalyst for the reaction and a solubilizer for the resulting condensation product.

In the above outlined processes for the making of the glue-mix, we have found it to be preferable prior to mixing together the gum accroides, the aldehyde and the inorganic alkaline catalyst into an aqueous medium to first treat the gum with the water so as to form an aqueous dispersion of the same. Then this aqueous dispersion is mixed with the aldehyde and the alkaline catalyst. We have found this procedure to be more desirable than adding the gum to an aqueous alkaline solution as the powdered gum, upon coming in contact with the aqueous alkaline solution, swells so rapidly that a protective gelatinous layer forms around the dry powdered gum with the subsequent formation of lumps. In subsequent steps it is difficult to break this gelatinous layer so as to allow the lumps to go into solution.

In order to more fully present our invention and the process for preparing the same, we herewith disclose the following example. However, it is to be understood that this example is by way of illustration only and is not to be interpreted as limitations on the invention.

Example No. I

On a weight basis 21.8 parts of powdered gum accroides is dispersed in about 32.6 parts of water to form an aqueous accroides dispersion. To this dispersion is added approximately 19.0 parts of formalin, 3.2 parts of sodium carbonate, 0.05 part of lucust bean gum, 10.9 parts of Glufil and 12.5 parts of 50% sodium hydroxide to form an aqueous mixture. This mixture is maintained at a value in the range of 180–201° F. for approximately 20 minutes so as to allow the gum accroides and the formaldehyde to make a glue-mix. This glue-mix is applied to wood veneers to make an exterior grade plywood.

Although the use of these glue-mixes has been described and illustrated mainly with respect to the bonding of wood veneers in plywood the same is also applicable as a binder in hardboard. More explicitly, in the manufacture of hardboard, wood is converted into chips and then these chips are passed through an Asplund defibrator wherein the chips are defibrated into bundles of fibers and individual fibers. These bundles of fibers are sorted so as to collect only those in a desired size range. In turn, these bundles and fibers of suitable size are intimately mixed with the gum-accroides glue-mix, formed into a fibrous blanket and pressed at an elevated temperature to form the hardboard. In this fibrous blanket and under the application of heat and pressure, the gum accroides-aldehyde resin in the glue-mixes flows so as to be more uniformly dispersed throughout the mat and also to more completely bond together the fibrous material.

Since certain changes may be made in the above composition of matter and different embodiments of the invention can be made without departing from its scope, viz., the phenolic-type compound, the aldehyde and the gum accroides may be mixed together to make a raw glue-mix which is subsequently heated to make the glue-mix, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described our invention, what we claim as new and desire to secure by Letters Patent is:

We claim:

1. In making an adhesive, the process which comprises heating a mixture consisting essentially of an aqueous dispersion of gum accroides, formaldehyde, a water-soluble alkali metal alkali, a gum selected from the group consisting of locust bean, karaya, and guar gums, and a fibrous organic filler until the reaction is substantially complete, the weight of gum accroides used being in excess of the formaldehyde on the anhydrous basis and the product being a water-dispersible accroides-formaldehyde adhesive.

2. An adhesive composition comprising the product of heating a mixture consisting essentially of an equeous dispersion of gum accroides, formaldehyde, a water-soluble alkali metal alkali, a gum selected from the group consisting of locust bean, karaya, and guar gums, and a fibrous organic filler until the reaction is substantially complete, the weight of gum accroides used being in excess of the formaldehyde on the anhydrous basis.

References Cited in the file of this patent

UNITED STATES PATENTS

| 1,902,461 | Novotny | Mar. 21, 1933 |
| 1,907,088 | Novotny | May 2, 1933 |
| 2,150,698 | Nevin | Mar. 14, 1939 |
| 2,300,307 | Novotny | Oct. 27, 1942 |

FOREIGN PATENTS

| 225,944 | Great Britain | Dec. 15, 1924 |